June 6, 1961 H. GANG 2,986,993

PUNCTUATION PRINTING MECHANISM FOR DIGITAL PRINTERS

Filed Oct. 24, 1960 6 Sheets-Sheet 1

INVENTOR
HERMAN GANG
BY
Norman Friedman
ATTORNEY

June 6, 1961 H. GANG 2,986,993

PUNCTUATION PRINTING MECHANISM FOR DIGITAL PRINTERS

Filed Oct. 24, 1960 6 Sheets-Sheet 2

INVENTOR
HERMAN GANG
BY Norman Friedman
ATTORNEY

June 6, 1961 H. GANG 2,986,993

PUNCTUATION PRINTING MECHANISM FOR DIGITAL PRINTERS

Filed Oct. 24, 1960 6 Sheets-Sheet 3

INVENTOR
HERMAN GANG
BY
Norman Friedman
ATTORNEY

June 6, 1961 H. GANG 2,986,993

PUNCTUATION PRINTING MECHANISM FOR DIGITAL PRINTERS

Filed Oct. 24, 1960 6 Sheets-Sheet 4

INVENTOR
HERMAN GANG
BY
Norman Friedman
ATTORNEY

June 6, 1961 H. GANG 2,986,993

PUNCTUATION PRINTING MECHANISM FOR DIGITAL PRINTERS

Filed Oct. 24, 1960 6 Sheets-Sheet 5

INVENTOR
HERMAN GANG
BY
Norman Friedman
ATTORNEY

June 6, 1961 H. GANG 2,986,993

PUNCTUATION PRINTING MECHANISM FOR DIGITAL PRINTERS

Filed Oct. 24, 1960 6 Sheets-Sheet 6

INVENTOR.
HERMAN GANG

BY
Norman Friedman
ATTORNEY

United States Patent Office 2,986,993

Patented June 6, 1961

2,986,993
PUNCTUATION PRINTING MECHANISM FOR DIGITAL PRINTERS

Herman Gang, Morris Plains, N.J., assignor to Monroe Calculating Machine Company, Orange, N.J., a corporation of Delaware Filed Oct. 24, 1960, Ser. No. 64,653
24 Claims. (Cl. 101—93)

This application is a continuation-in-part of my patent application Serial No. 624,828, filed November 28, 1956 (now abandoned).

The present invention pertains to digital printing mechanism which is provided with means for printing appropriate punctuation for the digital values printed by said mechanism. More specifically, the invention has to do with digital printing mechanism which includes provision for printing a punctuation mark for indicating a decimal point at any selected one of a plurality of available decimal point positions; and which includes as a feature thereof provision for printing punctuation setting off the triads of consecutive digits lying to the left of the selected decimal point position.

In listing machines which print numerical values, it is customary to print a decimal point at a fixed location. This location is usually between the tens and hundreds orders since most commercial calculations involve values of dollars and cents. For many types of computing work, however, it is often necessary that the decimal point be printed at other ordinal location. Further, the operator of the machine may desire to vary the position at which the decimal point is located.

It is an object of the present invention to provide decimal point printing mechanism by means of which the decimal point indication may be selectively printed at any one of different ordinal locations.

It is a further object to provide decimal point printing mechanism in which the decimal point indication may be printed at any one of different ordinal locations by means of punctuation type members each coupled to a digit type member for operation therewith.

With reference to the printing of a decimal fraction having one or more zeros between the decimal point and the first significant digit, it is a further object of the invention to automatically print the decimal point indication at the selected location, and all said zeros.

The invention further contemplates the printing of punctuation for setting off each triad of three consecutive digits to the left of the decimal point, such punctuation being printed by the same type members which are employed for decimal point printing. In one form of the invention, such triad-separating punctuation comprises commas in accordance with customary arithmetic notation. In this form, the punctuation type members are provided with both decimal point and comma type faces. At the ordinal location where the decimal point is to be printed, the appropriate punctuation type member will be so adjusted and controlled that its decimal point type face will be effective to print; while the third higher order punctuation type members are automatically controlled to print commas. In another form, the punctuation type members have a single type face, which preferably is the period used for indicating the decimal point, to both indicate the decimal point position and separate the triads of consecutive digits to the left thereof.

Other objects and advantages of the invention will be readily apparent from the following detailed description of embodiments thereof when read in connection with the accompanying drawing, in which.

GENERAL DESCRIPTION OF MACHINE

Figure 1:
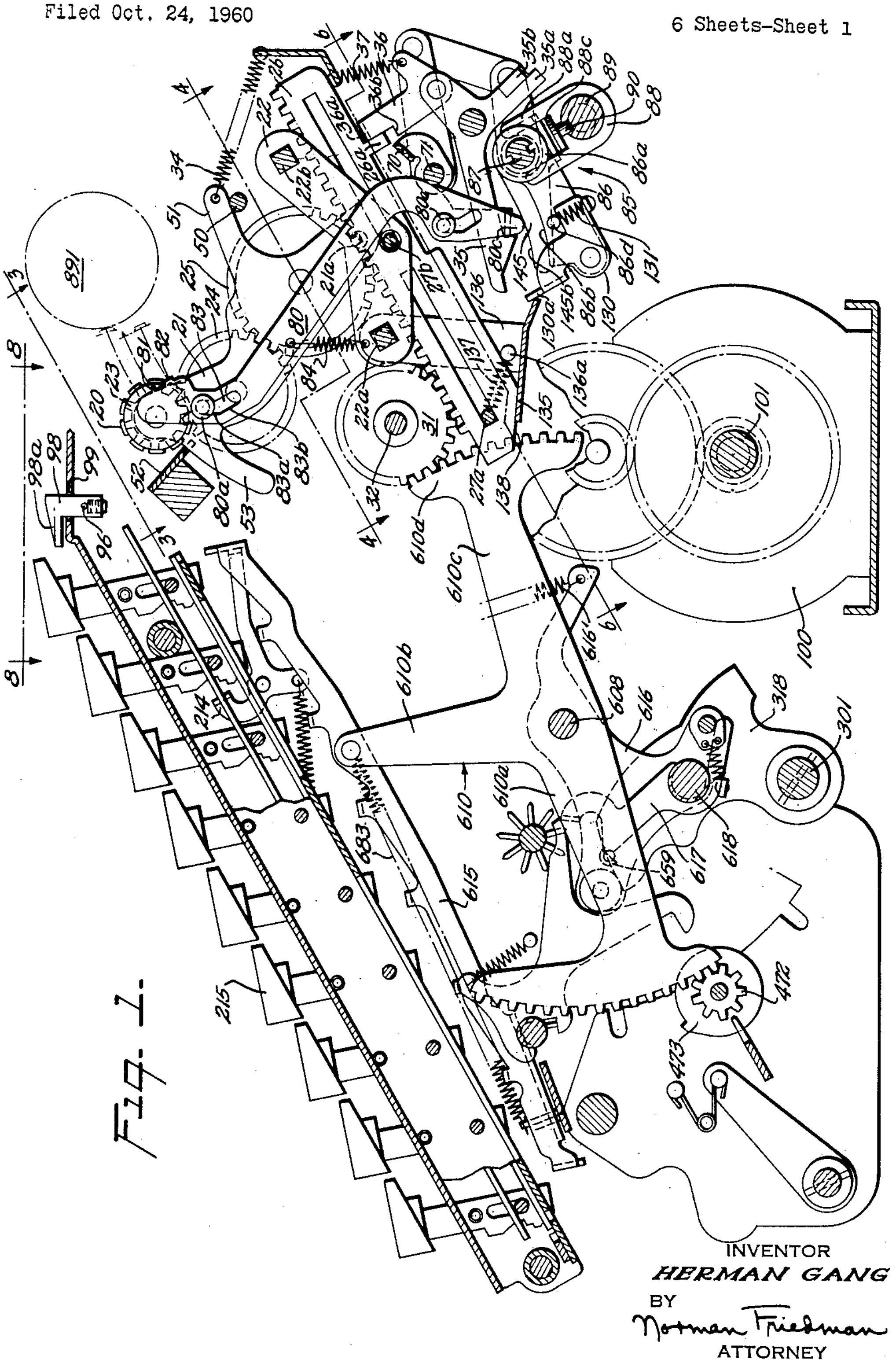
FIG. 1 is a side view partially in section of an adding-listing machine in which the mechanism of the present invention is incorporated, showing, inter alia, the numeral keys, numeral wheel, printing mechanism, and digital actuating mechanism of one order.

For the purposes of the present disclosure, the punctuation printing mechanism of the invention is shown and described as embodied in an adding-listing machine generally of the type disclosed in United States Patent No. 2,678,161, granted May 11, 1954 to Howard M. Fleming, a modified form of digit printing arrangement being substituted for the digit printing mechanism of the patent as set forth subsequently in detail. It will be understood, however, that the mechanism of the invention can readily be applied to and incorporated in many other specific types of business, adding, and calculating machines.

The machine is provided with a conventional keyboard comprising denominationally arranged rows of digit keys 215. Amounts set up on keys 215 are transferred additively or subtractively upon operation of a plus key 114 (FIG. 2) or minus key 274 to a denominational series of accumulator or register wheels 473 (FIG. 1) by means of a series of spring operated differential actuators 610 loosely mounted on a transverse shaft 608. Each actuator lever 610 comprises a forwardly extending arm **610*a*, an upwardly extending arm 610*b*, and a rearwardly extending arm 610*c*. The forward arm 610*a* of each differential actutor 610 is provided with a toothed segment adapted to mesh with pinions 472 of the series of accumulator wheels 473. Index or stop bars 615 are pivotally connected to the upper arms 610*b* of actuators 610, counterclockwise rotation of actuators 610 moving these index bars into engagement with the stems of selectively depressed keys 215. The rear arm 610*c* of each actuator terminates in a toothed segment 610*d*** adapted to control the digital setting of type wheels as described subsequently.

The digit keys 215 which have been depressed to represent a value are latched in position with the bottoms of their stems lying in the path of movement of upwardly extending stop lugs of the related index bars 615. Bars 615 are accordingly allowed to advance a distance proportional to the value of a depressed key upon operation of the machine. Depression of a digit key will also remove a column latch 214 from the path of movement of its related stop bar 615, these latches preventing movement of a stop bar and lever 610 in any column in which no key has been depressed.

The actuators 610 are held in normal clockwise position against the tension of their respective springs 683 by studs 659 fast in said actuators and having engagement with a series of dogs 617 pivotally mounted upon a transverse rod 618 supported within a rocker frame 616 loosely mounted on shaft 608.

Figure 2:
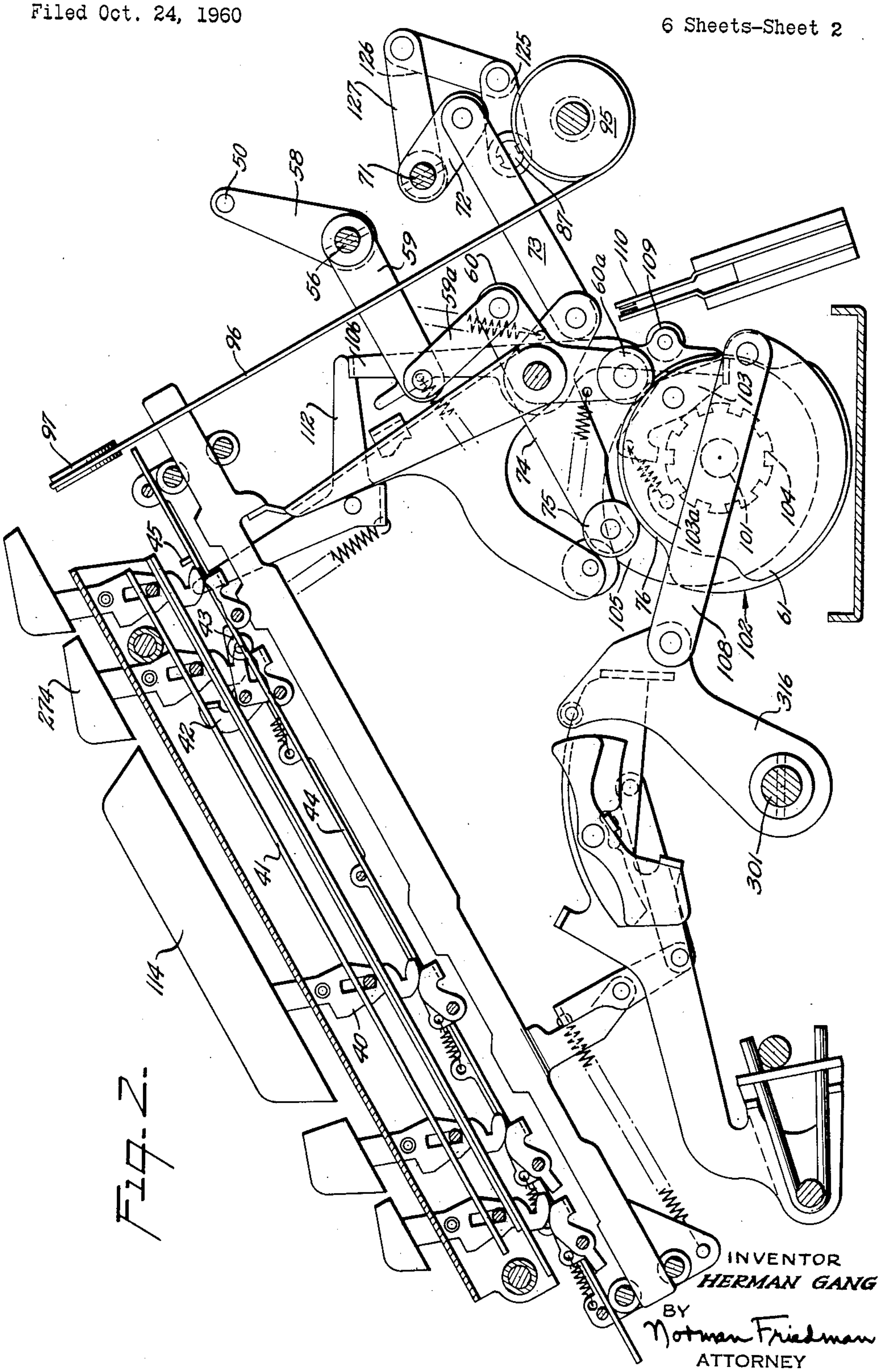
FIG. 2 is a side view of the machine partially in section, this view being taken to the right of the various operation control keys of the keyboard.
Figures 6, 7, 8:
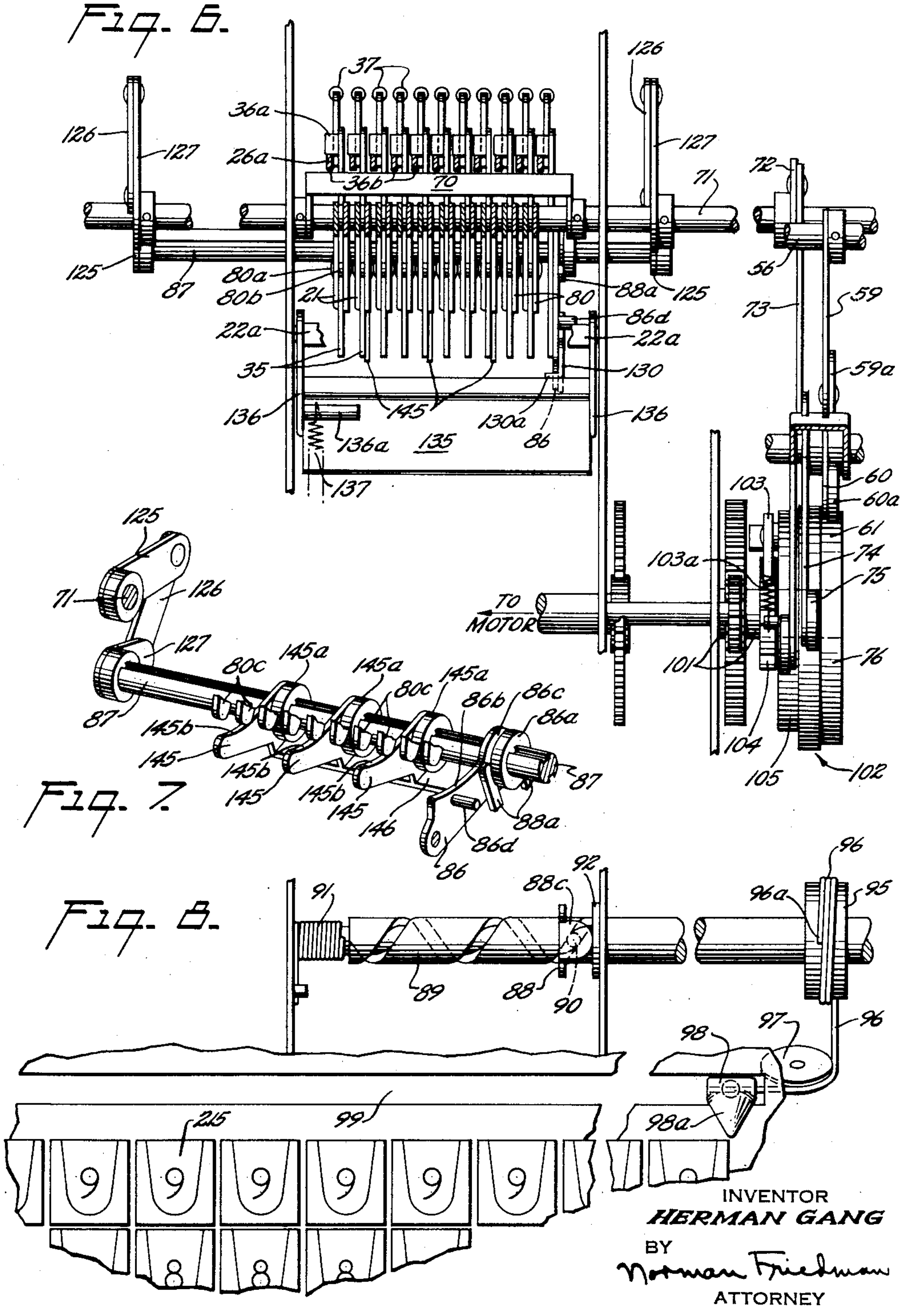
FIG. 6 is a sectional view taken on line 6—6 of FIG. 1.
FIG. 7 is a perspective view showing the control cranks for selectively enabling the punctuation type bars for decimal and comma printing.
FIG. 8 is a view taken on line 8—8 of FIG. 1 showing the mechanism for ordinally shifting the decimal and comma enabling mechanism of FIG. 7.

A rock shaft 301 is oscillated by means of an electric motor 100 connected through suitable reduction gearing with a shaft 101 (FIGS. 1, 6) journalled in the machine framing and having fast thereon a toothed clutch driving member 104 (FIGS. 2, 6). Loosely mounted on shaft 101 is a triple cam cluster 102. A clutch pawl 103 pivoted to the left side of cam cluster 102 is urged counterclockwise into driven engagement with toothed member 104 by a spring 103*a* secured to the cam cluster, but is normally blocked against such movement by the lower end of a clutch control lever 106. A rock arm 316 fast on shaft 301 is driven by a connecting rod 108 pivoted at its rear end to the right side of cam cluster 102. When the cam cluster is rotated by motor 100, shaft 301 will be oscillated by connecting rod 108.

Rock shaft 301 is provided with cam means 318 (FIG. 1) fast thereon for governing the movement of frame 616. As shaft 301 is rotated forwardly, cam 318 will permit frame 616 to be rocked counterclockwise under the influence of spring 616', and any of the actuator levers 610 which have been released by the depression of digit keys 215 will be allowed to rotate counterclockwise under the influence of their springs 683 until they are stopped by the lugs of index bars 615 abutting the stems of the depressed keys. Upon rearward return movement of shaft 301, cam 318 will restore frame 616 and the dogs 617 will return the operated levers 610 to normal position. This excursion of the levers 610 serves to register amounts set in the keyboard upon one or more accumulators 473 and to set up a similar amount on the printing line of the type wheels.

Release of clutch pawl 103 (FIG. 2) is effected upon depression of any of the motor keys, the stems of which are provided with a cam surface 40 acting upon depression of a key to move a slide 41 forwardly, thereby operating a bell crank lever 42, raising roller 43 of said lever out of engagement with a suitable opening in a spring operated slide 44. Slide 44 is provided with a lug 45, which upon depression of an operating key and subsequent forward operation of slide 44 engages the upper arm of a pivoted latch 112, thereby releasing said latch from clutch control lever 106, whereupon said lever will be moved counterclockwise by a suitable spring, and an insulated roller 109 on said lever will act to close a switch 110 in the circuit of the electric motor 100. In this movement, the lower end of lever 106 will be disengaged from the spring urged clutch pawl 103 and allow said pawl to fall into engagement with the driving clutch member 104 to effect a machine cycle of operation.

During a cycle of operation the wheels of the accumulators, if engaged, are rotated subtractively upon the forward stroke or additively upon the return stroke of the actuators 610, there being an actuator lever 610 and an associated accumulator wheel for each order of the machine. The timed meshing and unmeshing of the accumulator gears is controlled as described in U.S. Patent 2,055,623, granted September 29, 1936 to L. P. Crosman, to which reference is made for a detailed description of such mechanism.

Near the end of a cycle of operation of the machine, slide 44 is restored to disengage the clutch and restore the various control elements to normal position under the control of cam 105 of cam cluster 102 as set forth in detail in col. 4, lines 54 et seq. of Patent No. 2,678,161. The cam 105 of the present disclosure varies somewhat in contour from the cam edge of plate 105 of the patent, but is readily seen to be effective to perform the same control function as set forth in the patent.

PRINTING MECHANISM

Figure 3:
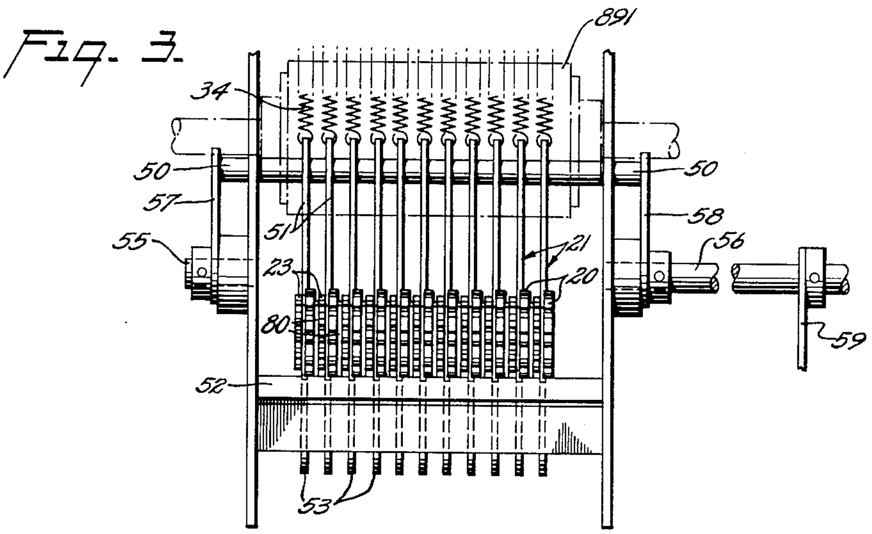
FIG. 3 is a view taken on line 3—3 of FIG. 1.

Printing is effected on a record sheet inserted around a platen 891 (FIGS. 1, 3) mounted in the machine framing in any well-known manner.

The printing means includes an ordinally arranged series of type members comprising digit type wheels 20 (FIGS. 1, 3, 5) each pivotally mounted at the upper right hand portion of a type hammer 21. Disposed about the periphery of each type wheel 20 is a plurality of numeral type faces for printing the various digits zero through nine inclusive, each wheel normally being in zero registering position and adapted to be differentially rotatively set by differential rotation of the actuators 610.

Type hammers 21 are rotatably mounted at their lower portions at 21*a* on an ordinal series of brackets 22 fixed on two shafts 22*a*, 22*b* secured in the machine framing and extending across the machine.

Mounted on the left side of each type hammer 21 is a gear 23 coaxial with the type wheel 20, gear 23 and wheel 20 being pinned together for rotation as a unit. Meshed with gear 23 is a gear train comprising gears 24 and 25, both of which are pivotally mounted on type hammer 21. At a point substantially in lateral alignment with the pivotal mounting 21*a* of hammer 21 on bracket 22, gear 25 is in mesh with a rack 26. Racks 26 are slidably supported for forward movement on two fixed shafts 27*a*, 27*b* extending across the machine and passing through two elongated longitudinal slots formed in each rack. Shaft 27*b* extends through a suitable aperture provided in each bracket 22.

Figure 4:
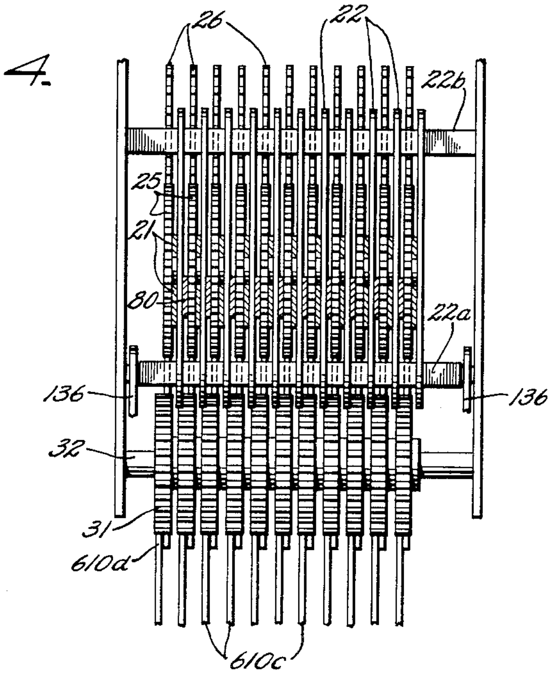
FIG. 4 is a sectional view taken on line 4—4 of FIG. 1.

The forward and rearward excursion of racks 26 is effected by rotation of digital actuator member 610. To this end, there is disposed forwardly of each type hammer 21 a relatively wide idler gear 31, the gears 31 being loosely supported on a fixed shaft 32 extending across the machine. The left-hand portion of wide gear 31 (FIGS. 1, 4) is in mesh with the rearwardly extending toothed segment 610*d* of actuator 610, while the right-hand portion of said gear is meshed with the teeth of rack 26.

There is thus provided a differential setting power train between digital actuators 610 and type wheels 20, said power train comprising toothed segment 610*d*, gear 31, rack 26, gear 25, gear 24, and gear 23. As hereinbefore described and as set forth in the previously mentioned patents, in the first half of a machine cycle rotary actuator 610 is permitted an amount of rotary excursion proportional to a digital value to be registered in the particular order. The elements composing the setting power train are so correlated that a given amount of counterclockwise digital excursion of actuator 610 will produce a proportional rotation of type wheel 20 whereby the corresponding digit type face of said type wheel will be brought into registering position. In normal condition of the parts as shown in FIG. 1, the type wheels 20 are in zero registering position.

Type hammers 21 (FIGS. 1, 5) are urged rearwardly clockwise to printing position by relatively heavy springs 34, but are normally maintained in forward ineffective position by pivoted latches 35 cooperating with rightwardly extending lugs formed at the lower ends of the type hammers. Pivotally mounted on a rearwardly extending portion of each latch 35 is a bell crank 36 biased counterclockwise by a spring 37 and held in clockwise position by abutment of a laterally extending lug 36*a* of the bell crank with a downwardly extending projection 26*a* of rack 26. Spring 37, acting through bell crank 36, maintains latch 35 in latching engagement with hammer 21. Type hammers 21 are further maintained in forward non-printing position by a bail 50 extending across the machine and engaging the undersides of rearwardly extending noses 51 of type hammers 21. Shortly after the beginning of a cycle of operation, bail 50 is moved downwardly from blocking relation with hammers 21, whereupon the hammers are restrained from rearward printing movement solely by latches 35. Printing is effected at approximately mid-cycle by releasing latches 35 clockwise, whereupon hammers 21 are hurled rearwardly to the platen by springs 34. The hammers are guided in their forward and rearward movement by an aligning comb 52 (FIGS. 1, 3), forward noses 53 of the hammers extending through the slots of the comb.

The mechanism relating to the operation and control of bail 50 will now be described.

Two axially aligned stub shafts 55, 56 (FIGS. 2, 3, 5) are rotatably mounted in the framing on opposite sides of the machine. Mounted fast on said stub shafts are cranks 57 and 58 respectively, bail 50 being secured to and extending between the upper portions of the cranks. A forwardly extending crank 59 (see also FIG. 6) fast on the right end of shaft 56 has link connection **59*a* with the rearwardly extending arm of a pivoted bell crank 60, said bell crank being spring biased clockwise and having a roller 60*a* on its downwardly extending arm, said roller riding on a cam 61 of cam cluster 102**.

Cam 61 is of such contour as to rock bell crank 58 clockwise at about one quarter cycle of machine operation thereby lowering bail 50 from blocking engagement with the rearwardly extending nose of hammers 21. Cam 61 maintains bail 50 in this lowered position throughout the printing operation which, as stated previously, is effected at approximately mid-cycle and in which hammers 21 are released from latches 35 and hurled clockwise to platen 891 by springs 34. Bail 50 is maintained in lowered position until after printing is effected, whereupon the roller follower **60*a* of bell crank 60 returns to the low dwell of cam 61, rocking crank 58 and bail 50 counterclockwise. In this counterclockwise return movement, bail 50 engages the underside of the noses of hammers 21 and restores the hammers counterclockwise to their normal, forward, non-printing position of FIG. 1 where they are reengaged by latches 35**.

At printing time, all significant type members (i.e., those whose numeral wheels register a significant value) will be unlatched for printing by a latch release plate 70 (FIGS. 1, 5, 6) extending across the printing orders of the machine just forwardly of the ordinal row of latch bell cranks 36, and mounted fast on a transverse rock shaft 71 (see also FIG. 2) journalled in the machine framing. A crank 72 fast with said rock shaft has link connection 73 with the rear arm of a pivotally mounted bell crank 74, the bell crank including a roller 75 riding on a cam 76 of cam cluster 102. Under the control of cam 76, shaft 71 will be rocked clockwise and returned with each cycle of machine operation. It will be recalled that bell crank 36 of each latch 35 is normally held in clockwise position (FIG. 1) against the bias of spring 37 by abutment with the downwardly extending projection **26*a* of rack 26. In this position of bell crank 36, latch release plate 70** will merely rock idly up and down in front of the bell crank.

The registration of a significant value in any order will condition the latch mechanism of that order for release at printing time by permitting bell crank 36 to move counterclockwise into the path of latch release plate 70. As stated earlier a significant value is registered in any given type wheel 20 in response to forward clockwise excursion of the corresponding actuator 610 which, through the wide idler gear 31, causes rack 26 to move forwardly. This forward movement of rack 26 and its projection **26*a* permits bell crank 36 to be swung counterclockwise by spring 37, bringing a shoulder 36*b* of the bell crank into the path of and below the rear portion of latch release plate 70. On the downward stroke of plate 70, it will engage shoulder 36*b* and swing latch 35 clockwise out of latching engagement with type hammer 21, whereupon the hammer is vigorously rocked clockwise to platen 891 for printing by spring 34. All significant type hammers will in such fashion be fired by latch release plate 70** at printing time.

Means is also provided whereby zeros to the right of significant digits are printed. For this purpose, each latch 35 (FIGS. 1, 5) is provided on its tail portion **35*a* with a laterally extending tongue 35*b* overlapping the tail of the next proximate lower order latch. Clockwise release movement of any significant latch at printing time will cause release of the latches of lower order non-significant (zero registering) type members by engagement of tongues 35*b*** with the tails of the lower order latches.

Immediately after printing has been effected, hammers 21 are restored counterclockwise to forward non-printing position by elevation of restoring bail 50 under the control of cam 61 as described previously.

PUNCTUATION PRINTING

(*General description*)

Connected to each type hammer 21 other than the lowest order hammer is a punctuation type bar 80 (FIGS. 1, 3, 4, 5) provided with an upper decimal type face 81 and a lower, comma type face 82. Type bar 80 is slidably mounted on the right side of a hammer 21 and to the right of type wheel 20 by means of headed pins **80*a* secured to the hammer and extending through V-shaped slots 83 formed in the type bar, each slot comprising an upper vertical portion 83*a* and a lower oblique portion 83*b*. A spring 84 (FIG. 1) normally maintains the type bar 80 in lowered, disabled position relative to the hammer 21 (as shown in FIG. 1) wherein both type faces 81 and 82 are disposed below the printing line of type wheel 20. Type bar 80 is maintained in laterally spaced relation to hammer 21 by enlarged portions 80*b* (FIG. 5) of pins 80*a*** between the bar and hammer.

At printing time, each released type hammer 21 and its punctuation type bar 80 will jointly move rearwardly as a unit to the platen. Normally, however, printing will be effected only by the type wheels 20, the punctuation type faces 81 and 82 of type bars 80 being ineffective by virtue of the lowered disabled position of said type bars, and accordingly type bars 80 will merely operate idly with type hammers 21. The path of movement of the registering digit type face of type wheel 20 and the punctuation type faces 81 and 82 when hammer 21 is released for printing is shown in broken lines in FIG. 1.

In a modified form of the invention (FIGS. 9, 10) the punctuation type bars are provided with a single type face, preferably the decimal type face (i.e., a period), for printing both the decimal point indication and the punctuation which would be designated by commas in the first form.

PUNCTUATION PRINTING

(*Decimal printing*)

In order that a decimal point be printed at any desired ordinal location it is necessary that the appropriate punctuation type bar 80 be raised relative to its type hammer 21 from its normal, disabled position of FIG. 1 an amount sufficient to bring its decimal type face 81 to the printing line of type wheel 20. To perform this function, there is provided a decimal control unit 85 (FIGS. 1, 5) disposed below the lower rounded end noses **80*c* of type bars 80**, and ordinally movable to immediately underlie any selected one of said punctuation type bars.

Control unit 85 includes a crank 86 (see also FIG. 7) having a hub portion **86*a* splined to a rock shaft 87 for rotation with and sliding movement along said rock shaft, said crank being formed with an upper cam surface 86*b* adapted for cooperative lifting engagement with nose 80*c* of any one of type bars 80. Hub portion 86*a* is provided intermediate its sides with an annular groove 86*c* into which extend the arms 88*a* of a yoke 88, said yoke having a hub 88*b* loosely encompassing a rotatable worm shaft 89 (FIG. 8) and further including a laterally extending lug 88*c* having secured thereto a pin 90 extending downwardly into the helical groove of worm shaft 89. It will readily be seen that rotation of worm shaft 89 will cause lateral shifting of yoke 88 which in turn will cause a corresponding shifting movement of crank 86 along rock shaft 87** to which it is splined.

Means are provided whereby the operator of the machine can set decimal control unit 85 in any desired ordinal position as follows:

Worm shaft 89 (FIG. 8) is rotatably mounted in the machine framing and includes at its right end a pulley drum 95 (FIG. 2). Wrapped around drum 95 is a cord 96, one end 96*a* of the cord being secured fast to the drum. Cord 96 is extended upwardly from drum 95 around a pulley 97 mounted at the upper right hand portion of the machine to the stem of an operating key 98 (FIG. 1) having a forwardly extending pointer portion 98*a*. Key 98 is supported for lateral setting movement in an elongated transverse slot 99 of considerable length provided in the upper portion of the machine casing.

A heavy torsion spring 91 (FIG. 8) mounted on the left end of worm shaft 89 biases the latter clockwise (FIG. 2) whereby yoke 88 (and therefore unit 85) will normally be maintained at the right end of the helically grooved portion of the worm shaft with lug 88*c* abutting a rubber pad 92 (FIG. 8) secured to the machine framing. In this position of decimal control unit 85, crank 86 will underlie the first order printing mechanism which, as stated earlier, does not include a punctuation type bar.

The diameter of pulley drum 95 and the helical pitch of worm shaft 89 are so correlated that when the pointer 98*a* of operating key 98 is disposed between any two ordinal rows of digit keys 215, decimal control unit 85 will be in the corresponding ordinal position relative to type hammers 21 with crank 86 in vertical alignment with the type bar 80 corresponding to the left one of said two rows of digit keys. In this regard it will be recalled that each punctuation type bar 80 is mounted to print to the right of its associated type wheel 20. To print a decimal point at any ordinal location between any two ordinal digits, it is therefore necessary to enable the punctuation type bar 80 which is coupled to the type hammer corresponding to the higher of said two digits.

Any suitable detent means (not shown) can be provided for operating key 98 to releasably maintain said key in its adjusted ordinal setting.

If subsequently it is desired to print without a decimal point, key 98 can be manually released from the latching effect of the detent means, thereby permitting worm shaft 89 to be returned to its normal clockwise position under the urging of torsion spring 91, the clockwise return movement of the worm shaft shifting yoke 88 and control unit 85 to their rightmost position in which decimal control crank 86 underlies the lowest order printing mechanism, and causing cord 96 to be wound on drum 95 whereby operating key 98 is likewise shifted to its extreme righthand position.

Control unit 85, having been set in the desired ordinal position for decimal point printing, is operable to raise punctuation type bar 80 to bring its decimal type face 81 to printing position as follows. Fast on each end of rock shaft 87 upon which crank 86 is splined, is a lever 125 (FIGS. 5, 6, 7) having link connection 126 with a member 127 fixed on rock shaft 71. Since, as described previously, shaft 71 is oscillated in time with machine cycling, cyclic oscillatory movement will likewise be imparted to rock shaft 87.

In normal position of the parts, cam surface 86*b* of crank 86 lies somewhat below nose 80*c* of type bar 80. Clockwise rotation of rock shaft 87 during the first half of a machine cycle will cause cam surface 86*b* of crank 86 to engage nose 80*c* and elevate type bar 80 to bring decimal type face 81 to enabled printing position, the pin and slot coupling between type hammer 21 and punctuation type bar 80 permitting this enabling adjustment of the latter element. It should be noted that the above described vertical adjustment of type bar 80 to decimal printing position is effectuated prior to release of latches 35.

The type hammer 21 to which the aforedescribed elevated type bar 80 is coupled will be unlatched for printing if a significant value is registered in that order or any higher order. Significant value registration in the order containing the enabled punctuation type bar will condition latch 35 for release by permitting bell crank 36 to move into the oscillatory path of latch release plate 70 upon forward excursion of rack 26. Significant value registration in a higher order will cause release of the latch 35 of said higher order at printing time, which in turn will bring about release of latches to the right by virtue of the laterally extending tongue 35*b* provided on each latch, whereby zeros are printed.

If, however, the value to be printed is a decimal fraction having no significant digits to the left of the decimal point, provision is made for effecting printing by the type hammer 21 to which the punctuation type bar 80 to be enabled is coupled in response to operation of any lower order printing mechanism in causing a significant digit to be printed. As stated earlier, release of any latch will cause release of all latches to the right by operation of the lateral tongues provided on said latches. Accordingly, when a decimal fraction having one or more zeros to the right of the decimal point is to be printed, release of the particular hammer latch for bringing about decimal point printing will cause the zeros to the right of the decimal point also to be printed.

As an example let it be assumed that the type wheels 20 register the decimal fraction .000317 which is to be printed, decimal control unit 85 having been previously ordinally positioned so that crank 86 underlies the punctuation type bar 80 associated with the seventh order type hammer 21. In this regard, it will be recalled that each punctuation type bar 80 is mounted on the right side of its associated hammer 21 and type wheel 20. Suitable mechanism, described below in detail, is provided such that registration of any of the significant digits (in this example the three, one, or seven) will condition the seventh order printing mechanism to bring about release of its latch 35 at printing time. Release of said latch at printing time will trigger off the latches of the sixth, fifth, and fourth orders by operation of tongues 35*b*. The machine will therefore print the value 0.000317.

The mechanism whereby the above operations are carried out will now be described.

Decimal control unit 85 (FIGS. 1, 5) includes a member 130 pivotally mounted on the front portion of crank 86, said member being normally biased to counterclockwise position abutting a pin 86*d* on said crank by a spring 131 secured to the pin. Member 130 is formed at its front portion with an upwardly extending lug 130*a*. As described previously, crank 86 is rocked clockwise and returned during each cycle of machine operation. When member 130 is in normal counterclockwise position, lug 130*a* merely moves idly toward and away from latch 35 with each cycle of oscillation of crank 86. For decimal point printing, member 130 is swung clockwise on its pivotal mounting on crank 86 and maintained in clockwise position in opposition to the bias of spring 131. When member 130 is so positioned, the forwardly extending nose of latch 35 will lie in the path of oscillation of member 130. At printing time, therefore, lug 130*a* in its upward stroke will engage latch 35 and swing the latter clockwise thereby freeing type hammer 21 for printing.

Member 130 is swung clockwise upon registration of a significant digit in any order as follows:

A bail 135 (FIGS. 1, 5, 6) disposed below racks 26 and forwardly of members 130 extends across the printing orders and is loosely pivotally mounted on round end portions of square shaft 22*a* by bracket arms 136 integral with said bail. A spring 137 secured between shaft 27*a* and a laterally extending rod 136*a* fast with the left bracket arm 136 urges bail 135 clockwise and maintains its upper front surface in engagement with a beveled cam surface 138 formed at lower front portion of each rack 26, rod 136*a* functioning as a stop by engagement with the undersides of the higher order racks 26. Forward movement of any rack 26 in registration of a significant value will cause cam surface 138 of that rack to rock bail 135 counterclockwise whereby the downwardly bent rear portion of the bail will, by engagement with lug 130*a*, swing member 130 clockwise to position said lug so that its upper edge underlies latch 35. On the next upward stroke of crank 86, lug 130*a* will engage and move latch 35 upwardly from latching engagement with hammer 21 to free the latter for printing. The release of latch 35 by lug 130*a* of member 130 will cause release of the latches of those orders immediately to the right of the decimal printing order which register a value of zero by operation of overlapping tongues 35*b*.

Reverting to the exemplary decimal fraction .000317 given previously, registration of any of the significant values three, one, or seven will involve forward movement of the appropriate ordinal rack 26 whereby its cam surface 138 will rock bail 135 rearwardly counterclockwise, such movement of the bail swinging member 130 clockwise to position lug 130*a* for releasing latch 35 on the next upward stroke of crank 86. At printing time, the type hammers of the significant orders—in this example the first three orders—will be released by latch release plate 70 engaging shoulders 36*b* in its downward forward stroke, while the seventh order latch (beneath which decimal control unit 85 has previously been set by the operator) will be released by lug 130*a* of member 130 in the upward stroke of crank 86 to print the decimal point and incidentally the seventh order zero. Release of the seventh order latch by member 130 will cause release of the sixth, fifth, and fourth order latches by tongues 35*b*. During the rearward printing stroke of the seventh order hammer and the enabled punctuation type bar 80 coupled thereto, nose 80*c* of the latter will slide forwardly along cam surface 86*b* which is contoured to maintain said type bar elevated to enabled position throughout the printing stroke.

PUNCTUATION PRINTING (COMMA PRINTING)

In setting down a whole number having four or more digits, it is conventional in numerical notation to set off each triad of three consecutive digits from the digits to the left thereof by commas. The present invention provides means whereby such commas are always automatically printed in the appropriate ordinal position relative to the decimal point. For a number having no more than three digits, no comma will be printed; for a number having four to six digits a comma will be printed between the third and fourth digits; for a number having seven to nine digits, commas will be printed to the right of the seventh and fourth digits; for a number having ten or eleven digits (the latter being the full capacity of the instant machine) commas will be printed to the right of the tenth, seventh, and fourth digits.

Provision is also made such that when the decimal point is to be printed intermediate any two digits, commas will be printed in the correct ordinal position relative to the decimal point regardless of the position of the decimal point.

Comma printing is effectuated by the same punctuation type bars employed to print the decimal point. As stated earlier, each type bar 80 includes a comma type face 82 disposed beneath the decimal type face 81. To enable a particular type bar 80 for comma printing, therefore, it is necessary that the bar be raised an amount sufficient to bring its comma type face 82 to printing line (registering) position, i.e., to a position substantially in lateral alignment with the registering line of the type wheels 20. In other words, adjustment of a type bar to print a comma requires that it be raised a greater amount than is necessary for decimal point adjustment. To achieve proper ordinal positioning of the printed commas, it is further necessary that there be comma enablement of only every third punctuation type bar 80 to the left of the type bar which is to print the decimal point.

The comma enabling mechanism comprises a series of laterally spaced cranks 145 (FIGS. 1, 5, 7) each of which includes a hub portion 145*a* splined to rock shaft 87 for rotation with and movement along said rock shaft. Cranks 145 are disposed on rock shaft 87 to the left of decimal control crank 86, the cranks 145 and 86 all being rigidly secured together by a tie bar 146 for unitary transverse movement along shaft 87. The rightmost comma control crank 145 is spaced from crank 86 along shaft 87 a distance equal to three printing orders, the same spacing along shaft 87 being provided for successive ones of said cranks 145. While the presently disclosed machine is provided with three such comma control cranks, it is apparent that a greater or lesser number may be employed depending upon the total number of printing orders in the machine.

In view of the constant three order spacing of cranks 145 relative to decimal control crank 86 and each other, it will be seen that regardless of the ordinal positioning of the decimal control unit, cranks 145 will always be located to provide for printing of the appropriate ordinal commas in relation to the decimal point. In this regard, when decimal crank 86 is at its extreme right-hand position beneath the first order printing mechanism, comma cranks 145 will directly underlie the fourth, seventh, and tenth order punctuation type bars 80.

Cranks 145 are operative to enable the appropriate type bars 80 for comma printing as follows. Each of said cranks includes a cam surface 145*b* normally positioned just below noses 80*c* of the type bars, said cam surfaces being of such contour that they are disposed closer to said noses than is cam surface 86*b* of decimal control crank 86. When shaft 87 is rocked clockwise, cranks 86 and 145 will in their upward movement engage the overlying type bars, but because of their higher cam surfaces cranks 145 will cause a greater degree of elevation of their type bars than is achieved by decimal crank 86. The punctuation type bars 80 enabled by cranks 145 will therefore be elevated to bring their comma type faces 82 to printing position, while the type bar enabled by crank 86 will have been raised a lesser amount to present its decimal type face 81 for printing.

Figure 5:
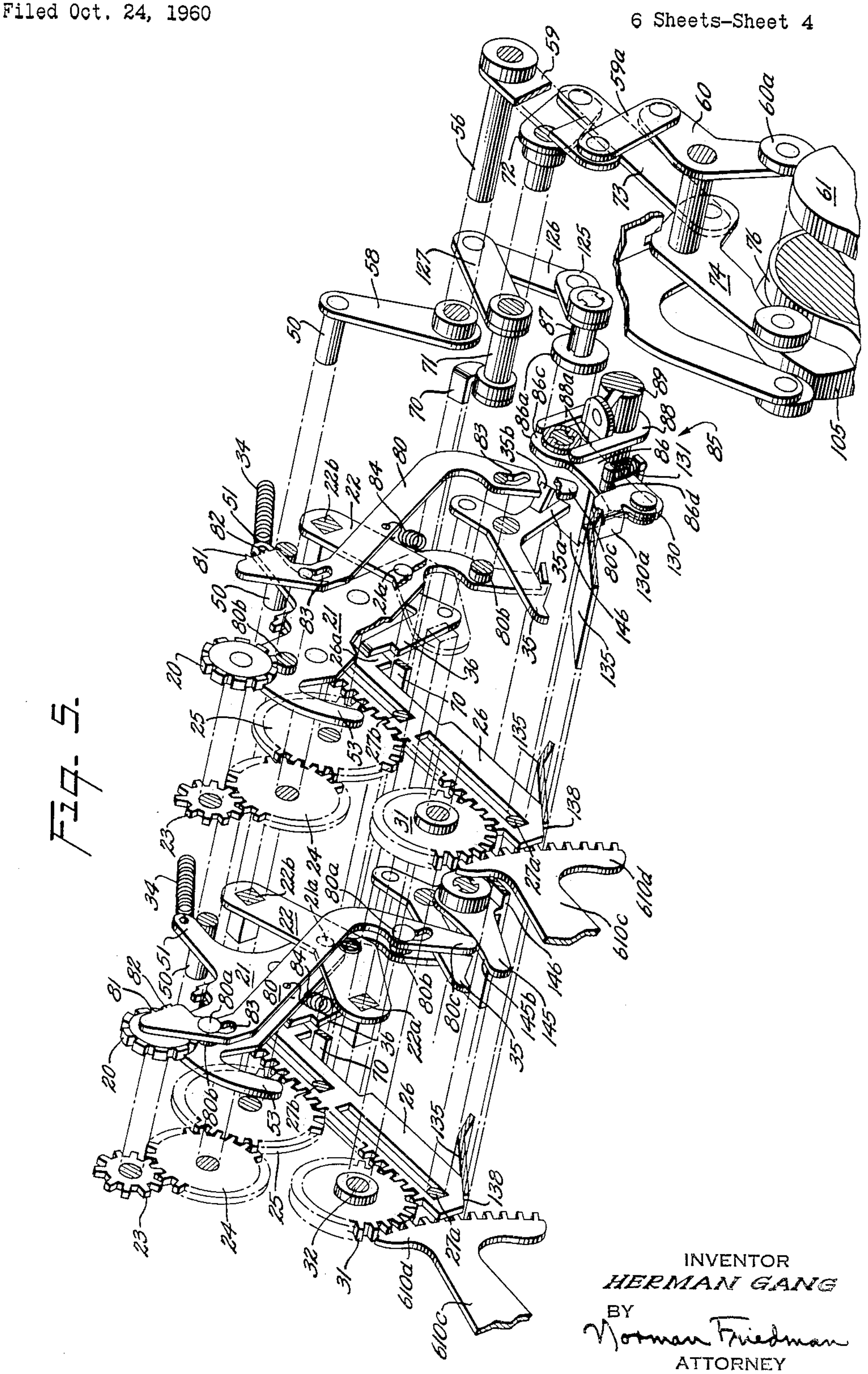
FIG. 5 is an exploded perspective view showing the second and fifth order printing mechanism.

Referring to FIGS. 1 and 5, the V-shaped slots 83 of punctuation type bars 80, which slots permit enabling elevation of the bars, each consists of an upper vertical leg 83*a* and a lower oblique leg 83*b*, while the decimal and comma type faces 81 and 82 are provided on an obliquely extending portion of the type bar. If a type bar 80 is to be enabled for printing a decimal point, the upward movement of the bar on pins 80*a* will be controlled only by vertical legs 83*a* of the slots, and accordingly decimal type face 81 will rise vertically to enabled registering position. If, however, a comma is to be printed, the greater degree of lift of bar 80 caused by crank 145 will place the final portion of the upward movement of the bar under the control of the oblique slot legs 83*b*, whereby the punctuation type bar will simultaneously move vertically and forwardly in the final stage of comma enablement. The resultant forward positioning of the decimal type face 81 insures that it will be maintained well away from the printing line and will therefore not print accidentally when the type bar 80 is adjusted for comma printing.

At printing time, the decimal point will be printed as described previously. A comma will also be printed by any punctuation type bar 80 which has been enabled for comma printing by a crank 145, provided of course, that the hammer 21 to which the bar is coupled is unlatched for digit printing. Since each punctuation type bar 80 is mounted on the right side of a type wheel it will print a comma in conjunction with the next higher order digit.

During the printing stroke of the comma-enabled type bars 80, they will be maintained in elevated, enabled position by engagement of their noses 80*c* with cam surfaces 145*b* of cranks 145.

This arrangement automatically provides that a comma will be printed to the left of a period of three digits only when at least one significant digit is to be printed in any order to the left of said period.

Since a comma need never be printed to the right of the hundreds order, the punctuation type bars 80 of the second and third orders may be provided with a decimal type face only.

Figure 9:
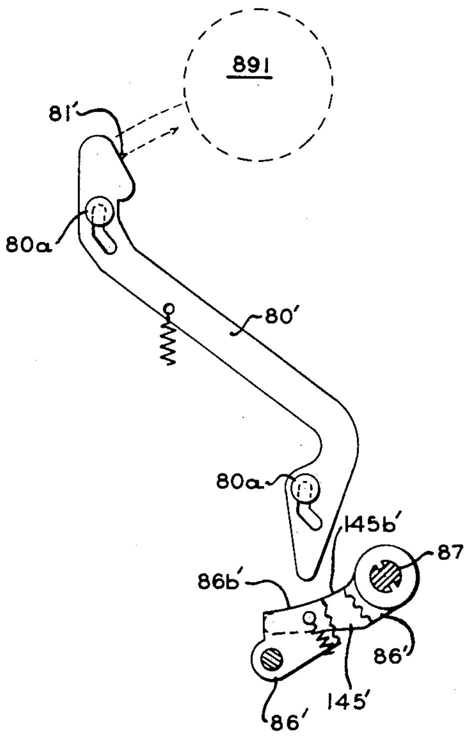
FIG. 9 is a right side elevation detail view showing a modified form of the punctuation type members and their associated enabling mechanism.

The above-described preferred embodiment conforms to customary arithmetic notation in that it prints a decimal point (i.e., a period) to mark the selected decimal point position, and commas to set off the triads of consecutive digits to the left thereof. However, a satisfactory, less complicated, and less expensive version can be employed in which the same punctuation, preferably the period, is used for both indicating the decimal point position and separating the digital triads. FIG. 9 shows a modified form of the invention embodying this concept. In this form, all the punctuation type members 80′ are provided with a single type face 81′ for printing a period, the comma type face 82 being omitted.

It will be recalled that in the first form of the invention, the comma-enabling cranks 145 are contoured to effect a greater degree of lift of the punctuation type members 80 than the decimal point crank 86. This is necessary since the type members 80 have separate vertically spaced decimal point and comma type faces.

However, the uppermost operating surfaces 86*b*′, 145*b*′ of the punctuation enabling cranks 86′ and 145′ of FIG. 9 are all of the same elevation and contour, since the punctuation printed is the same for both marking the decimal point and separating the digital triads to the left thereof. Hence, in all cases the punctuation type members 80′ will be lifted by cranks 86′ and 145′ the same amount to enable them for printing the same, single type of punctuation indicia.

Figure 10:
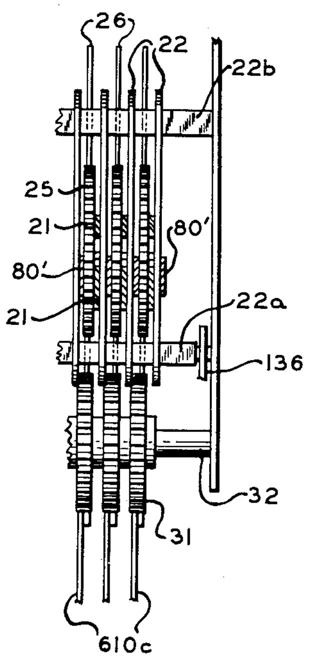
FIG. 10 is a fragmentary view similar to FIG. 4 of the modification of FIG. 9, showing the first four orders of the printing mechanism.

When the same punctuation is used for decimal point indication and digital triad separation, it is desirable that the first (units) order of the printing mechanism be provided with a punctuation type member 80′ to the right thereof, as shown in FIG. 10, for the following reason. Consider a condition where the machine is set for printing only whole values, i.e., with the visual decimal point indicator 98*a* set to the right of the units order of the machine as in Fig. 8, and the machine registers a value of four or more digits, e.g., 52,345 which are to be printed. In the first form of the invention, the value will be printed as written above, the absence of a decimal point and the presence of the comma denoting it to be a whole value. However, if only periods are used for punctuation and there were no punctuation type member provided for the units order, the value printed would be 52.345 . In such a case, it would be impossible to determine by mere visual inspection whether the value was actually 52,345 or 52.345 . By including an additional punctuation type member 80′ with (to the right of) the units order, the value printed would be 52.345. ; and the operator would know that in all cases, regardless of the set position of the decimal point, the rightmost period appearing in the printed value designates the decimal point position and the periods to the left thereof indicate the triad separation. For example, if the decimal point were set between the third and fourth orders, an actual value such as 2,871,052.346 would be printed 2.871.052.346 . Employing the rule stated above, the operator would read the right-most period as representing the decimal point, and each period to the left as corresponding to the conventional comma.

Further, while I have disclosed mechanism for printing both the decimal point and triad separating punctuation, it will be understood that where desired, the machine may be arranged for printing only the decimal point. In such event the punctuation type bars 80, which then may be provided with a decimal type face only, may be mounted on the left side of the type hammers 21 and type wheels 20 so as to print the decimal point in conjunction with the next lower order digit. In printing decimal fractions, this arrangement will eliminate the printing of the zero to the left of the decimal point.

If the machine is to print only the decimal point indication, a stripped-down version of the invention can be employed in which a decimal point type member is provided only at every second ordinal position. Of course, if both the decimal point and triad-separating indicia are to be printed, it would usually be necessary to include a punctuation type member for each ordinal position, since at least the first triad punctuation to the left of the decimal point is an odd number of orders (three) to the left of the decimal point in all cases.

Further, in the previously described embodiments of the invention disclosed herein, a selected decimal point type member is caused to operate to print the decimal point for a decimal fraction under control of a lower order digit printing mechanism. It will be apparent however that within the broadest scope of the invention, any printing mechanism to the right of the decimal point type member, whether that printing mechanism prints digits or other indicia, could perform this control function. For example, to the right of the lowest order digit type member there would be provided a customary auxiliary type member similar to and differentially adjustable in substantially the same fashion as the digit printing members, but adapted to print any one of the usual symbols representative of the various machine functions, i.e., add, subtract, total, subtotal, etc. The differential adjustment of this auxiliary type member would be controlled by the particular function key depressed. The bail 135 would extend across the differential setting rack 26 for this auxiliary type member. Accordingly, setting movement of the rack would be effective to rock the bail rearwardly and thereby enable the printing latch tripping mechanism for the decimal point in precisely the same manner as described in detail earlier.

While I have disclosed the printing mechanism of the present invention as applied to an adding-listing machine, it will be understood that said mechanism may be used in conjunction with other types of business and calculating machines, as for example printing calculating machines which perform multiplication and division.

Many other modifications and equivalents within the spirit and scope of the invention will be apparent to those skilled in the art. Accordingly, it is intended that the foregoing disclosure of various embodiments of the invention be illustrative only and not limitative of the following claims.

I claim:

1. In a business machine having printing mechanism including a series of differentially settable type members at least some of which are ordinally arranged digit type members operable to print plural digit values: a series of decimal point type members each effective to print a decimal point at a corresponding given decimal position for said plural digit values, any one of said decimal point type members being adapted to be selected for printing operation; selection means for selecting any one of said decimal point type members for printing a decimal point for a value printed by said digit type members; and means controlled by said selection means for causing printing operation of the selected one decimal point type member, said means controlled by said selection means including means effective to cause operation of said selected one decimal point type member at the given selected decimal position corresponding to said selected one decimal point type member if a type member of any of the differentially settable type members to the right of said given selected decimal position is operated.

2. In a business machine having ordinally arranged printing mechanism including an ordinal series of differentially settable digit type members operable to print plural digit values: a decimal point type member normally inoperable to print a decimal point at a given decimal position for each of said plural digit values and adapted to be enabled; means for disabling said decimal point type member from printing a decimal point for a value printed by said digit type members; means for selectively enabling said decimal point type member for printing a decimal point for a value printed by said digit type members; and means effective to cause operation of said decimal point type member at said given decimal position if a digit type member of any of the orders lower than said given decimal position is operated.

3. In a business machine having ordinally arranged printing mechanism including an ordinal series of differentially settable digit type members operable to print plural digit values: a series of decimal point type members each normally inoperable to print a decimal point at a corresponding given decimal position for each of said plural digit values and adapted to be enabled; means for disabling said decimal point type members from printing a decimal point for a value printed by said digit type members; means for enabling any selected one of said decimal point type members for printing a decimal point for a value printed by said digit type members; means effective to cause operation of said selected one decimal point type member at the given decimal position corresponding to said selected one decimal point type member if a digit type member of any of the orders lower than the decimal position corresponding to said selected one decimal point type member is operated.

4. The invention according to claim 2, said decimal point type member being coupled to one of said digit type members for operation therewith.

5. The invention according to claim 3, said decimal point type members being coupled to said digit type members for operation therewith.

6. In a business machine having ordinally arranged printing mechanism including an ordinal series of normally ineffective differentially settable digit type members, and means for rendering said digit type members effective; normally disabled decimal point type means operable to print a decimal point in association with any selected digit type member, means for coupling said decimal point type means to said digit type members for operation therewith, means for selectively enabling said decimal point type means to print a decimal point with any one digit type member, and means for operating said one digit type member upon operation of a lower order digit type member.

7. In a business machine having ordinally arranged printing mechanism including an ordinal series of normally ineffective differentially settable digit type members, and means for rendering said digit type members effective; normally disabled decimal point type means operable to print a decimal point in association with any selected digit type member, means for coupling said decimal point type means to said digit type members for operation therewith, means for selectively enabling said decimal point type means to print a decimal point with any one digit type member, and means for rendering said one digit type member effective for printing in response to operation of any lower order printing mechanism in causing a significant digit to be printed.

8. In a business machine having ordinally arranged printing mechanism including an ordinal series of normally ineffective differentially settable digit type members, and means for rendering said digit type members effective; an ordinal series of normally disabled decimal point type members for selectively printing a decimal point at different ordinal locations, means coupling each decimal point type member to a digit type member for operation therewith, means for selectively enabling any one decimal point type member, and means for rendering effective for printing the digit type member to which said one decimal point type member is coupled in response to operation of any lower order printing mechanism in causing a significant digit to be printed.

9. In a business machine having ordinally arranged printing mechanism including an ordinal series of normally ineffective differentially settable digit type members normally set to zero registering position, means for rendering significant type members effective, and means responsive to the rendering effective of any type member for rendering effective the next lower order non-significant type member; an ordinal series of normally disabled decimal point type members for selectively printing a decimal point at different ordinal locations, means coupling each decimal type member to a digit type member for operation therewith, means for selectively enabling any one decimal type member, and means for rendering effective for printing the digit type member to which said one decimal type member is coupled in response to operation of any lower order printing mechanism in causing a significant digit to be printed.

10. The invention set forth in claim 9, said last named means including: a normally disabled member for rendering effective for printing the digit type member to which said one decimal type member is coupled, and means for enabling said normally disabled member in response to operation of any lower order printing mechanism in causing a significant digit to be printed.

11. In a business machine having ordinally arranged printing mechanism including an ordinal series of normally ineffective differentially settable digit type members normally set to zero registering position, means for rendering significant type members effective, and means responsive to the rendering effective of any type member for rendering effective the proximate lower order non-significant type member; an ordinal series of normally disabled decimal point type members for selectively printing a decimal point at different ordinal locations, means coupling each decimal type member to a digit type member for operation therewith, a first member for selectively enabling any one of said decimal type members, said first member being mounted for selective ordinal movement to cooperable relation with any one decimal type member, a second normally disabled member joined to said first member for ordinal movement therewith and operable to render effective for printing the digit type member to which said one decimal type member is coupled, and means for enabling said second member in response to significant value registration in any lower order digit type member.

12. In a business machine having ordinally arranged printing mechanism including an ordinal series of differentially settable digit type members operable to print plural digit values: and ordinal series of punctation type members operable to print a decimal point punctuation mark for indicating any selected one of a plurality of decimal point positions for said plural digit values, said plurality of decimal point positions including positions to the left of the third lowest order digit of said plural digit values printed by said digit type members, said punctuation type members being also operable to print punctuation marks separating the triads of consecutive digits of said plural digit values lying to the left of said selected one decimal point position; means for enabling any selected one of said punctuation type members to print said decimal point punctuation mark at said selected one decimal point position of said plurality of decimal point positions; means for automatically enabling the third higher order punctuation type members lying to the left of said selected one punctuation type member to print said triad-separating punctuation marks; and operating means for said digit type members and said punctuation type members, said operating means being effective to (*a*) cause a digital value printing operation of all differentially set digit type members including all digit type members to the right of said selected one decimal point position, and (*b*) also cause printing operation of said selected one punctuation type member and said third higher order punctuation type members to respectively print said decimal point punctuation mark and said triad-separating punctuation marks for the digital value printed by said digit type members.

13. The combination according to claim 12, wherein said decimal point punctuation mark and said triad-separating punctuation marks are all alike.

14. The combination according to claim 13, said ordinal series of differentially settable digit type members including a rightmost, units order digit type member, said plurality of decimal point positions including a position to the right of the units order digit of said plural digit values.

15. In a business machine having ordinally arranged printing mechanism including an ordinal series of normally ineffective differentially settable digit type members, and means for rendering said digit type members effective; an ordinal series of normally disabled punctuation type means each operable to print a decimal point at an ordinal position, each of said punctuation type means being alternately operable to print a comma, means for selectively enabling any one punctuation type means to print a decimal point, and means for enabling the third higher order punctuation type means for comma printing.

16. In a business machine having ordinally arranged printing mechanism including an ordinal series of normally ineffective differentially settable digit type members, and means for rendering said digit type members effective; an ordinal series of normally disabled punctuation type members each operable to print a decimal point in association with a digit type member, the fourth and higher ordinal ones of said puctuation type members being alternatively operable to print a comma, means for selectively enabling any one punctuation type member to print a decimal point, and means for enabling for comma printing at least each third higher order punctuation type member which is disposed between said one punctuation type member and the highest order type member which registers a significant value.

17. In a business machine having ordinally arranged printing mechanism including an ordinal series of normally ineffective differentially settable digit type members, and means for rendering said digit type members effective; an ordinal series of normally disabled punctuation type members each operable to print a decimal point, the fourth and higher ordinal ones of said punctuation type members being alternatively operable to print a comma, means coupling each punctuation type member to a digit type member for operation therewith and permitting adjustment of said punctuation type member between disabled and enabled positions, means for selectively enabling any one of said punctuation type members for decimal point printing, and means for enabling each third higher order punctuation type member for comma printing.

18. In a business machine having printing mechanism including at least one character type member; a symbol printing member operable to selectively print any one of a plurality of different symbols, means connecting said symbol printing member to said character type member for printing operation therewith and mounting said symbol printing member for movement to a plurality of enabled positions, each of said positions corresponding to a different symbol to be printed, and means for moving said symbol member to any one of its enabled positions.

19. The invention according to claim 18, said connecting means comprising a pin and slot connection between said symbol printing member and said character type member.

20. In a listing machine having an accumulator register comprising an ordinal series of differentially adjustable accumulator wheels, ordinally arranged printing mechanism including an ordinal series of normally ineffective differentially settable digit type members, differential actuating mechanism for said accumulator wheels and digit type members, and means for rendering said digit type members effective; an ordinal series of normally disabled decimal point type members for selectively printing a decimal point at different ordinal locations, means connecting each decimal point type member to a digit type member for operation therewith, means for selectively enabling any one decimal point type member, and means for rendering effective for printing the digit type member to which said one decimal point type member is connected in response to operation of any lower printing mechanism in causing a significant digit to be printed.

21. In a business machine having ordinally arranged printing mechanism including an ordinal series of differentially settable digit type members mounted for printing movement from unoperated position to operated position; decimal point type means for selectively printing a decimal point at any one of different ordinal locations, means for connecting said decimal point type means to said digit type members for a uniform extent of operation in parallel therewith throughout any printing movement thereof and mounting said decimal point type means for movement between disabled and enabled position transverse to the printing operation movement thereof, and means for initiating said transverse movement of said decimal point type means to enabled position before said digit type members commence movement from unoperated to operated position, whereby any unwanted oscillation of said decimal point type means incident to said transverse movement is first minimized prior to said printing movement whereby to assure a complete dissipation thereof during said printing movement.

22. In a business machine having ordinally arranged printing mechanism including an ordinal series of differentially settable digit type members mounted for printing movement from unoperated position to operated position; decimal point type means for selectively printing a decimal point at any one of different ordinal locations, means for connecting said decimal point type means to said digit type members for a uniform extent of operation parallel adjacent therewith throughout each said printing movement and mounting said decimal point type means for movement between disabled and enabled position, and wherein said latter movement is in a direction transverse to the printing operation thereof, and means for selectively moving said decimal point type means to enabled position before said digit type members commence movement from unoperated to operated position, whereby any oscillations of said decimal type means incident to said movement to enabled position are reduced in part prior to said movement from said unoperated position to assure complete dissipation thereafter during said movement to said operated position.

23. In a business machine having ordinally arranged printing mechanism including an ordinal series of differentially settable digit type members mounted for printing movement from unoperated position to operated position; an ordinal series of decimal point type members for selectively printing a decimal point at any one of different ordinal locations, means connecting each decimal point type member to a digit type member for a uniform extent of parallel adjacent operation therewith during any said printing movement and mounting said decimal point type members for movement between disabled and enabled position, and wherein said latter movement is in a direction transverse of said uniform operation movement thereof and means for moving a selected decimal point type member to enabled position before the associated digit type member commences movement from unoperated to operated position, whereby maximum time is permitted for unwanted oscillations of the decimal type member caused in said transverse movement thereof to vanish.

24. In a cyclically operable business machine having ordinally arranged printing mechanism including an ordinal series of differentially settable digit type members mounted for printing movement from unoperated to operated position; an ordinal series of decimal point type members for selectively printing a decimal point at any one of different ordinal locations, means connecting each decimal point type member to a digit type member for a uniform extent of parallel printing operation therewith throughout printing movement and mounting said decimal point type member for movement between disabled and enabled position, and wherein said latter movement is in a direction transverse of the printing operation movement thereof, and means operable within a cycle of operation of said machine to move a selected decimal point type member to enabled position before the associated digit type member commences movement thereof from unoperated to operated position, and wherein any oscillation of said decimal point type member incident to said transverse movement is assured thereby to vanish coincident with said movement thereof from said unoperated to operated position.

References Cited in the file of this patent

UNITED STATES PATENTS

| | | |
|---|---|---|
| 1,197,277 | Ellis | Sept. 5, 1916 |
| 1,944,675 | Tauschek | Jan. 23, 1934 |
| 2,416,707 | Metzner | Mar. 4, 1947 |
| 2,678,161 | Fleming | May 11, 1954 |
| 2,688,439 | Landsiedel | Sept. 7, 1954 |
| 2,702,159 | Reppert | Feb. 15, 1955 |
| 2,765,736 | Swanson | Oct. 9, 1956 |
| 2,802,415 | Heinze | Aug. 13, 1957 |

UNITED STATES PATENT OFFICE
Certificate of Correction

June 6, 1961

Patent No. 2,986,993

Herman Gang

It is hereby certified that error appears in the above numbered patent requiring correction and that the said Letters Patent should read as corrected below.

Column 1, line 31, for "location" read —locations—; column 2, line 17, for "elevation" read —elevational—; column 7, lines 18, 46, and 47, for "clockwise", each occurrence, read —counterclockwise—; column 9, line 42, for "PUNCTUATION PRINTING (COMMA PRINTING)" read

PUNCTUATION PRINTING (*Comma Printing*)

column 14, line 57, for "and" read —an—.

Signed and sealed this 23rd day of October 1962.

[SEAL]

Attest:

ERNEST W. SWIDER,

*Attesting Officer.*

DAVID L. LADD,

*Commissioner of Patents.*